UNITED STATES PATENT OFFICE.

ARTHUR C. SPENCER, OF WASHINGTON, DISTRICT OF COLUMBIA.

PROCESS OF PRODUCING CEMENT AND PRODUCTS THEREOF.

1,012,467.  Specification of Letters Patent.  Patented Dec. 19, 1911.

No Drawing.  Application filed April 13, 1911.  Serial No. 620,833.

*To all whom it may concern:*

Be it known that I, ARTHUR C. SPENCER, a citizen of the United States, residing at Washington, in the District of Columbia, have invented certain new and useful Improvements in Processes of Producing Cement and Products Thereof, of which the following is a specification.

This invention relates to processes of producing cement and products thereof; and it comprises a method wherein certain zinc ore products, tailings or residues are submitted to a sintering or clinkering heat under conditions favoring the evolution of residual zinc in fume form, and advantageously in a rotary kiln, and the evolved zinc compounds are recovered from the waste gases of the heating operation while the sintered residue is collected and ground for cement purposes; and it also comprises as a new composition of matter a clinkered or sintered substance possessing cementitious properties when powdered and having the composition of a clinkered zinc ore gangue containing traces of zinc; all as more fully hereinafter set forth and as claimed.

Zinc ores of the franklinite-willemite type such as are mined and dressed in New Jersey, may be generally described as containing mainly franklinite, willemite, tephroite, zinkite, a manganiferous calcite gangue, and varying amounts of fluorite, feldspar, hornblende, pyroxene, garnet, etc. A rather complicated system of dressing and concentrating these ores is now in use. The granules of ore may of course carry several minerals at once. Generally the ore is granulated and first passed through magnetic separators of different strengths. The first magnets are generally not so powerful as those later used and they remove mainly franklinite and granules rich in franklinite. The next and stronger magnets remove most of the residual franklinite together with some hornblende, garnet, etc., giving what is known as "half-and-half". The residual mineral matter passing the magnets and including the calcite, willemite, zinkite, fluorite, feldspar, etc., is then treated by jigs, shaking tables, buddles, etc., giving concentrates rich in heavy zinc minerals and tailings rich in manganiferous calcite but also containing some zinc minerals and silicates carrying alumina and iron.

The accumulated tailings around the dressing works carry over 5 per cent. of zinc though present practice is supposed to reduce the amount thus lost to about 3 per cent. Most of the zinc is in the form of silicate or willemite though there is some ZnO replacing CaO in the calcite, as well as some franklinite carried by the calcite granules. These tailings are practically valueless. I have discovered that when these tailings are calcined at a temperature sufficient to expel the carbon dioxid of the calcite, there is an evolution of zinc which passes away as fumiform oxid with the carbon dioxid. This zinc apparently comes mainly from the manganiferous and zinkiferous calcite. The finer the comminution the greater is the amount of zinc evolved. If now the temperature be raised to the point where the lime begins to combine with the silica and silicates, that is, to a fritting, sintering, or clinkering temperature, there is a second and greater evolution of fumiform zinc oxid; probably from decomposition of the willemite and franklinite by lime. The iron of the franklinite combines with the lime, such FeO as is present quickly becoming peroxidized to $Fe_2O_3$.

The clinker resulting from heating to a clinkering temperature I find to be valuable as a cement when fine ground, possessing eminently good hydraulic properties. It may still contain from traces up to one-half per cent. of zinc oxid, though by regulating the heat treatment the zinc may be practically completely expelled. Its content of manganese is rather high. Probably this manganese functions in giving the cement hydraulic qualities.

The composition of the tailings as regards lime varies from day to day with the temporary ratio between gangue and ore in the material mined and treated, but the average composition is about right for cement purposes and in handling accumulated tailings, by a little selection to secure an average material, good cement can be made. Where the material is used as produced, these daily variations can be corrected by the addition of small amounts of clay when the tailings run rich in gangue and low in silica and sesquioxid, or of limestone when the gangue is deficient. An addition of "half-and-half" is also useful in correcting for high lime content; and such an addition enriches the zinc fume. This material may run between 20 and 30 per cent. of zinc oxid. It contains considerable silicates.

The "half-and-half" may be submitted to the present operation in lieu of the final ore tailings as a good recovery of zinc and a good cementitious clinker are obtained. Its composition may be corrected, when necessary, by the use of tailings of appropriate composition.

Any suitable furnace or heating means may be employed for heating the material to the clinkering temperature if provided with fume collecting means. The fumiform zinc oxid being extremely fine, such means should be efficient. Wet methods of collection may be employed; or the waste gases may be cooled and passed through bag filters. The heating may be performed in the ordinary rotary inclined cement kiln. With such a kiln both the zinc oxid evolved in the calcining stage and that evolved in the clinkering stage join the products of combustion and pass forward together with the dust incident to the operation of the kiln. The waste gases from the kiln may be passed through any ordinary form of fume collector, giving a mixture of calcareous dust and zinc oxid which may be treated as a zinc ore by concentrating or smelting. Two-section kilns provided with individual firing means may be employed to reduce the amount of barren kiln dust admixed with the zinc oxid recovered, less dust being evolved from cement mixtures where the calcining and clinkering are not performed by the same flame. Stationary kilns may be employed with briqueted ore. With either type of heating means, in lieu of sending the waste gases to a chimney stack they may first be directed through a cooler, such as vertical U-shaped piping and then through bag filters, using a fan to secure draft through the kiln.

In order to secure a maximum recovery of zinc, it is advantageous to prolong the period of exposure to a clinkering heat as long as possible, controlling the temperature to prevent actual fusion as the latter would injure the cement and practically preclude further recovery of zinc. The amount of zinc oxid evolved in a time unit is proportional to the surface exposed. For this reason, also, the originally granular material is best fine ground. The clinker finally produced is fine-ground to produce cement.

What I claim is:—

1. The process of producing a cement and recovering zinc which comprises comminuting calcareous ore tailings carrying zinc oxid and zinc silicate, exposing such tailings to a sintering heat and collecting the clinker and the fumiform zinc oxid produced.

2. The process of producing a cement and recovering zinc which comprises comminuting calcareous ore tailings from ores of the franklinite type, exposing such tailings to a sintering heat and collecting the clinker and the fumiform zinc oxid produced.

3. The process of producing a cement and recovering zinc which comprises comminuting calcareous ore tailings carrying zinc oxid and zinc silicate, passing the comminuted material down through a rotary kiln against opposed heating gases, finishing at a sintering heat, collecting the clinker produced and collecting the fumiform zinc oxid with the kiln dust.

4. In the recovery of zinc and the production of a cement, the process which comprises comminuting a concentration product of a franklinite ore, exposing to a calcining and a sintering heat and separately recovering the zinc oxid and clinker produced.

5. In the recovery of zinc and the production of a cement, the process which comprises comminuting a concentration product of franklinite ore, correcting the composition by additions of components lacking to make a high grade cement, exposing the mixture to a calcining and a sintering heat and separately recovering the zinc oxid and clinker produced.

6. In the recovery of zinc and the production of a cement, the process which comprises comminuting the final tailings from the concentration of franklinite ore, correcting the composition by addition of a concentration product carrying a higher amount of silicates, exposing the mixture to a calcining and a sintering heat and separately recovering the zinc oxid and clinker produced.

7. As a new composition of matter, a cement clinker having the approximate composition of calcined manganiferous franklinite ore tailings, carrying a fraction of a per cent. of zinc oxid, being in the form of clinkered aggregates and upon comminution exhibiting setting properties with water.

In testimony whereof, I affix my signature in the presence of witnesses.

ARTHUR C. SPENCER.

Witnesses:
JOHN H. SIGGERS,
K. P. McELROY.